(12) United States Patent
Manadhata et al.

(10) Patent No.: US 9,336,194 B2
(45) Date of Patent: May 10, 2016

(54) SUBMATCH EXTRACTION (75) Inventors: Pratyusa Kumar Manadhata, Piscataway, NJ (US); Stuart Haber, New York, NY (US); Miranda Jane Felicity Mowbray, Bristol (GB); Prasad V Rao, Metuchen, NJ (US); William G Horne, Lawrenceville, NJ (US)

(73) Assignee: Hewlett Packard Enterprises Development LP, Houston, TX (US)

( * ) Notice: Subject to any disclaimer, the term of this patent is extended or adjusted under 35 U.S.C. 154(b) by 77 days.

(21) Appl. No.: 14/374,797

(22) PCT Filed: Mar. 13, 2012

(86) PCT No.: PCT/US2012/028916
§ 371 (c)(1),
(2), (4) Date: Jul. 25, 2014

(87) PCT Pub. No.: WO2013/137864
PCT Pub. Date: Sep. 19, 2013

(65) Prior Publication Data
US 2014/0372105 A1    Dec. 18, 2014

(51) Int. Cl.
G06F 17/27 (2006.01)
G06F 17/30 (2006.01)
G06F 21/55 (2013.01)

(52) U.S. Cl.
CPC ........ G06F 17/2705 (2013.01); G06F 17/2775 (2013.01); G06F 17/30985 (2013.01); G06F 21/552 (2013.01); *G06F 17/271* (2013.01)

(58) Field of Classification Search
CPC ............ G06F 17/30985; G06F 17/271; G06F 17/2705; G06F 17/278; G06F 17/30684; G06F 8/427; H04L 63/1408; H04L 63/1433

USPC .......................... 704/9; 706/48; 707/758, 708
See application file for complete search history.

(56) References Cited

U.S. PATENT DOCUMENTS

| 5,680,332 | A | 10/1997 | Raimi et al. |
|---|---|---|---|
| 6,185,524 | B1 | 2/2001 | Carus et al. |
| 6,292,772 | B1 | 9/2001 | Kantrowitz |
| 6,626,960 | B1 | 9/2003 | Gillam |
| 8,032,479 | B2 | 10/2011 | Kori |
| 8,051,085 | B1 | 11/2011 | Srinivasan et al. |
| 8,874,550 | B1 * | 10/2014 | Soubramanien .. G06F 17/30572 707/708 |
| 2002/0042794 | A1 | 4/2002 | Konaka |
| 2004/0193399 | A1 | 9/2004 | Potter et al. |
| 2006/0085389 | A1 | 4/2006 | Flanagan et al. |
| 2009/0228474 | A1 | 9/2009 | Chiu et al. |
| 2010/0017850 | A1 | 1/2010 | More et al. |

(Continued)

OTHER PUBLICATIONS

"Perl Regular Expression Inconsistency", PerlMonks, Download Date: Mar. 13, 2013. <www.perlmonks.org/?node id=536515>.

(Continued)

*Primary Examiner* — Charlotte M Baker
(74) *Attorney, Agent, or Firm* — Mannava & Lang (57) ABSTRACT

A method for submatch extraction may include receiving an input string, receiving a regular expression, and converting the regular expression with capturing groups into a plurality of finite automata to extract submatches. The method further includes using a first automaton to determine whether the input string is in a language described by the regular expression, and to process the input string, and using states of the first automaton in a second automaton to extract the submatches.

20 Claims, 11 Drawing Sheets

(56) References Cited

U.S. PATENT DOCUMENTS

| | | | | |
|---|---|---|---|---|
| 2010/0114811 | A1* | 5/2010 | Lambov | G06N 5/02 706/48 |
| 2010/0153420 | A1* | 6/2010 | Yang | G06F 21/564 707/758 |
| 2011/0093496 | A1 | 4/2011 | Bando et al. | |
| 2011/0153641 | A1 | 6/2011 | Thorup et al. | |
| 2011/0258210 | A1 | 10/2011 | Agarwal et al. | |
| 2011/0295779 | A1 | 12/2011 | Chen et al. | |

OTHER PUBLICATIONS

"Regex Posix", Haskell Wiki, Download Date: May 15, 2013. <http://www.haskell.org/haskellwiki/Regex_Posix>.

"Regular Expressions", The Open Group Base Specification Issue 6, IEEE Std 1003.1, 2004. <http://pubs.opengroup.org/onlinepubs/009695399/basedefs/xbdchap09.html>.

"SIEM Solution for Enterprise Security Management", ArcSight: Arcsight ESM, Download Date: Apr. 3, 2013. <http://www.arcsight.com/products/products-esm/>.

Turn Machine Data into Real-time Visibility, Insight and Intelligence: Powerful search, analysis and visualizations. Thousands of enterprise customers. Quick to get started., Download Date: Apr. 3, 2013., <www.splunk.com/product>.

Becchi, Michela et al., Extending Finite Automata to Efficiently Match Perl-compatible Regular Expressions, Washington University, Dec. 9, 2008, < http://www.cs.wustl.edu/~perowley/a25-becchi.pdf >.

Benjamin, Brodie, et al., A Scalable Architecture for High-Throughput Regular-Expression Pattern Matching, Intl. Symp. Computer Architecture, IEEE Computer Society, 2006, pp. 191-202.

Brelaz, Daniel, "New Methods to Color the Vertices of a Graph", Communications of th Association of Computing Machinery 22, 251-256. Apr. 1979, vol. 22.

Bruggemann-Klein, Anne, et al., "One-Unambiguous Regular Languages", Information and Computation 142, 182-206 (1998).

Clark, Christopher R., et al., Scalable Pattern Matching for High Speed Networksl, IEEE Symp. On Field-Programmable Custom Computing Machines, IEEE Computer Society, 2004, pp. 249-257.

Clojure, Download Date: Mar. 13, 2013. <http://www.clojure.org>.

Cox, R. Implementing regular expressions, Aug. 2011 <http://swtch.com/rsc/regexp/>Apr. 26, 2012.

Cox, R., "An Efficient, Principled Regular Expression Library", Google Project Hosting; Download Date: Apr. 3, 2013. <https://code.google.com/p/re2/>.

Cox, Russ, "Regular Expression Matching Can Be Simple and Fast (But is Slow in Java, Perl, PHP, Python, Ruby, . . . )" Jan. 2007. <http://swtch.com/~rsc/regexp/regexp1.html>.

Cox, Russ, "Regular Expression Matching with a Trigram Index", Jan. 2012. <http://swtch.com/~rsc/regexp/regexp4.html>.

Cox, Russ, "Regular Expression Matching: the Virtual Machine Approach", Dec. 2009. <http://swtch.com/~rsc/regexp/regexp2.html>.

Cox, Russ, "Regular Expressions Matching in the Wild", Mar. 2010. <http://swtch.com/~rsc/regexp/regexp3.html>.

Davis, Mark, Text Boundaries, Mar. 25, 2005. < http://unicode.org/reports/tr29/tr29-9.html >.

Fowler, Glenn, "An Interpretation of the POSIX Regex Standard", Jan. 2003. <http://www2.research.att.com/~gsf/testregex/re-interpretation.html>.

Hazel, P. "PCRE—Perl Compatible Regular Expressions" Last Modified: Mar. 1, 2012. <http://www.pcre.org/>.

Hooimeijer, Pieter, et al., "An Evaluation of Automata Alogorithms for String Analysis", Microsoft Research Technical Report MSR-TR-201 0-90, Jul. 2010.

Hopcroft, John, E., et al., Introduction to automata theory, languages, and computation, 2nd edition, published Addison-Wesley, 2001.

Hutchings, B. L., et al., "Assisting Network Intrusion Detection with Reconfigurable Hardware", Department of Electrical and Computer Engineering, Brigham Young Univ., pp. 111-120, 2002.

Jurafsky, Daniel, et al., "Chapter 2, Regular Expressions and Automata", Speech and Language Processing: An Introduction to natural language processing, computational linguistics, and speech recognition, 2007.

Kearns, Steven Michael, "Extending Regular Expressions", Columbia University, 1990.

Kumar, Sailesh, et al., "Algorithms to Accelerate Multiple Regular Expressions Matching for Deep Packet Inspection", In: ACM SIGCOMM Conf. pp. 339-350, 2006.

Laurikari, V., Nfas with tagged transitions, their conversion to deterministic au-tomata and application to regular expressions, In: Proceedings of the Symposium on String Processing and Information Retrieval, Sep. 2000.

Laurikari, Ville, Efficient submatch addressing for regular expressions, Helsinki University of Technology, Nov. 1, 2001. < http://laurikari.net/ville/regex-submatch.pdf >.

International Searching Authority, Appl No. PCT/US2012/028916, filed Mar. 13, 2012, Search Report and Written Opinion, pp. 9, Nov. 23, 2012.

LogLogic: Loglogic products index. Download Date: Apr. 3, 2013,<http://www.loglogic.com/products/overview>.

McNaughton, R., et al. "Regular Expressions and State Graphs for Automata", IRE Transactions on Eletrical Computers, 1960.

Meiners, Chad R., et al., Fast Regular Expression Matching using Small TCAMs for Network Intrusion Detection and Prevention Systems, 19th USENIX Security Symposium, Aug. 2010.

Nicolett, Mark, et al., "Magic Quadrant for Security Information and Event Management (SIEM)", May 12, 2011. <http://www.gartner.com/DisplayDocument?doc\_cd=212454>.

Nourie, Dana, et al., "Regular Expressions and the Java Programming Language", Aug. 2001, Updated Apr. 2002. <http://java.sun.com/developer/technicalArticles/releases/1.4regex>.

Pike, R.,: The text editor sam. Softw. Pract. Exper. 17, Nov. 1987, pp. 813-845.

Rabin, M.O., et al., "Finite Automata and Their Decision Problems", IBM Journal, Apr. 1959.

Sidhu, Reetinder, et al., Fast Regular Expression Matching using FPGAs, Symp. on Field Programmable Custom Computing Machines, IEEE Computer Society, 2001, pp. 227-238.

Smith, R., et al., Deflating the Big Bang: Fast and scalable deep packet inspection with extended finite automata, SIGCOMM Conference, ACM, 2008, pp. 207-218.

Smith, R., et al., XFA: Faster signature matching with extended automata. In: Symp. on Security and Privacy, IEEE Computer Society, 2008, pp. 187-201.

Smith, Randy, et al., Backtracking Algorithmic Complexity Attacks Against a NIDS, Annual Computer Security Applications Conf., IEEE Computer Society, 2006, pp. 89-98.

Sommer, R., et al., Enhancing byte-level network intrusion detection signatures with context. In: Conference on Computer and Comm. Security, ACM, 2003 pp. 262-271.

Thompson, Ken, Programming techniques: Regular expression search algorithm, Commun. ACM 11, Jun. 1968, pp. 419-422.

Xeger: A Java library for generating random text from regular expressions, Download Date: Mar. 13, 2013.<http://code.google.com/p/xeger/wiki/XegerLimitations>.

Yang, L., Karim, et al., Improving nfa-based signature matching using ordered binary decision diagrams, In: RAID'10: Proceedings of the 13th International Symposium on Recent Advances in Intrusion Detection, vol. 6307 of Lecture Notes in Computer Science (LNCS)., Ottawa, Canada, Springer pp. 58-78, Sep. 2010.

Yang, Liu, et al, "Fast Submatch Extraction using OBDDs'", Tech. Rep., HP Labs, 2011.

Yang, Liu, et al., Fast, memory-efficient regular expression matching with NFA-OBDDs, Computer Networks 55(15), Oct. 2011, pp. 3376-3393.

Yu, Fang, et al., Fast and memory-efficient regular expression matching for deep packet inspection, ACM/IEEE Symp. on Arch. for Networking and Comm. Systems, 2006, pp. 93-102.

* cited by examiner

SUBMATCH EXTRACTION

BACKGROUND

Regular expressions provide a concise and formal way of describing a set of strings over an alphabet. Given a regular expression and a string, the regular expression matches the string if the string belongs to the set described by the regular expression. Regular expression matching may be used, for example, by command shells, programming languages, text editors, and search engines to search for text within a document. Known techniques for regular expression matching can have long worst-case matching times.

BRIEF DESCRIPTION OF DRAWINGS

Features of the present disclosure are illustrated by way of example and not limited in the following figure(s), in which like numerals indicate like elements, in which:

FIGS. 7A and 7B illustrate the automaton $M_4$ for the regular expression $((a)*|b)(ab|b)$, showing inputs from $Q_3$ and outputs in T*, respectively.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

Regular expressions are a formal way to describe a set of strings over an alphabet. Regular expression matching is the process of determining whether a given string (for example, a string of text in a document) matches a given regular expression, that is, whether it is in the set of strings that the regular expression describes. Given a string that matches a regular expression, submatch extraction is a process of extracting substrings corresponding to specified subexpressions known as capturing groups. This feature provides for regular expressions to be used as parsers, where the submatches correspond to parsed substrings of interest. For example, the regular expression $(.*)=(.*)$ may be used to parse key-value pairs, where the parentheses are used to indicate the capturing groups.

A submatch extraction system and a method for extracting submatches from a string that matches a regular expression are described herein. The system and method provide reduced submatch extraction times in the worst case. The submatch extraction system may include an input module to receive a regular expression. The regular expression may be used to create a pattern by a pattern creation module. In order to create the pattern, automata $M_1$, $M_2$, $M_3$ and $M_4$ may be respectively created by automata generation modules. An automaton is defined as an abstract machine that can be in one of a finite number of states and includes rules for traversing the states. The automata may be stored in the system as machine readable instructions. A comparison module may receive input strings, and match the input strings to the regular expression. If an input string does not match the regular expression, submatches are not extracted. However, if an input string matches the regular expression, the pattern created may be used to extract submatches by an output module. In this manner, the regular expression may be compiled by the automata generation modules, and then matched to many different input strings to extract submatches.

In an example, the submatch extraction system may generally include a memory storing a module comprising machine readable instructions to receive an input string, receive a regular expression, and convert the regular expression into a plurality of finite automata to extract submatches. The extracting may include using a first automaton to determine whether the input string is in a language described by the regular expression, and to process the input string, and using states of the first automaton as input to a second automaton to extract the submatches. The system may include a processor to implement the module.

In an example, the method for submatch extraction may include receiving an input string, receiving a regular expression, and converting the regular expression with capturing groups into a plurality of finite automata to extract submatches. The method may further include using a first automaton to determine whether the input string is in a language described by the regular expression, and to process the input string, and using states of the first automaton in a second automaton to extract the submatches.

A non-transitory computer readable medium may have stored thereon machine readable instructions for submatch extraction is also described. The machine readable instructions that when executed may cause a computer system to receive an input string, receive a regular expression, and convert the regular expression into a plurality of finite automata to extract submatches. The extracting includes using a first automaton to determine whether the input string is in a language described by the regular expression, and to process the input string, and using states of the first automaton in a second automaton to extract the submatches.

For regular expressions, the reluctant closure operator, denoted *?, is a variant of the standard greedy closure operator for regular expressions, denoted *, with different submatching behavior. Where other rules do not apply, shorter submatches to a subexpression E*? take priority over longer ones, whereas for E* the reverse is true.

For example, consider matching the string a=b=c first against the regular expression (.*?)=(.*), where the metacharacter '.' matches any character in the alphabet, and then against the regular expression (.*)=(.*?). In the first case, the two capturing groups (which are delimited by parentheses) should match a and b=c, respectively, while in the second case the respective submatches should be a=b and c. If the two capturing groups are both greedy or both reluctant, then matching behavior could in principle be governed by a standard related to precedence, although no suitable standard exists.

With regard to parsing, parsing using regular expressions may be used as a building block for security applications such as security information and event management (SIEM) systems. SIEM systems perform real-time analysis of event logs and security alerts generated by hardware and software systems in an enterprise network. Since each source generates its logs in a different format, a SIEM system may use submatch extraction to parse common fields, such as, for example, device name and attack source from the logs. In such a setting, a relatively small number of regular expressions, which are known in advance, may be matched to a large number of input strings in real time. In this regard, the submatch extraction system and method provide for efficient submatch extraction when matching a string to a regular expression that may contain reluctant operators, where the expression may be compiled in advance into a form that will speed up matching and submatching.

For the example of a submatch extraction system whose construction is described in detail herein, the syntax of regular expressions with capturing groups and reluctant closure on an fixed finite alphabet $\Sigma$, for example the standard ASCII set of characters, is:

$$E::= \in \cup a \cup EE \cap E | E \cup E^* \cup E^{*?} \cup (E) \cup [E] \qquad \text{Equation (1)}$$

For Equation (1), a stands for an element of $\Sigma$, and $\in$ is the empty string. The square brackets [,] are used to group terms in a regular expression that are not capturing groups. The parentheses (,) are reserved for marking capturing groups. Grouping terms is not explicitly needed when the order of operations is clear. Specifically, (,) and [,] have a higher priority than * and *?, which have a higher priority than concatenation, which has a higher priority than |. The submatch extraction system may use this syntax. Other examples of the submatch extraction system may perform submatch extraction for regular expressions written in a syntax that uses different notation to denote one or more of the operators introduced in Equation (1); or that does not include either or both of the operators * or *? in Equation (1); or that includes additional operators, such as, for example, special character codes, character classes, boundary matchers, quotation, etc.

Indices may be used to distinguish the capturing groups within a regular expression. Given a regular expression E containing c capturing groups marked by parentheses, indices $1, 2, \ldots c$ may be assigned to each capturing group in the order of their left parentheses as E is read from left to right. The notation idx(E) may be used to refer to the resulting indexed regular expression. For example, if $E=((a)^*|b)(ab|b)$ then $\text{idx}(E)=((a)^*_2|b)_1(ab|b)_3$.

If X, Y are sets of strings, XY is used to denote $\{xy:x \in X, y \in y\}$, and X|Y to denote $X \cup Y$. If $\beta$ is a string and B is a set of symbols, $\beta|_B$ denotes the string in B* obtained by deleting from $\beta$ all elements that are not in B. A set of symbols $T=\{S_t, E_t: 1 \le t \le c\}$ are introduced and may be referred to as tags. The tags may be used to encode the start and end of capturing groups. The language L(F) for an indexed regular expression F=idx(E), where E is a regular expression written in the syntax given by Equation (1), is a subset of $(\Sigma \cup T)^*$, defined by $L(\in)=\{\in\}$, $L(a)=\{a\}$, $L(F_1 F_2)=L(F_1)L(F_2)$, $L(F_1|F_2)=L(F_1) \cup L(F_2)$, $L(F^*)=L(F^{*?})=L(F)^*$, $L([F])=L(F)$, and $L((F)_t) = \{S_t: \alpha \in L(F)\}$, where $(\ )_t$ denotes a capturing group with index t. There are standard ways to generalize this definition to other commonly-used regular expression operators, so that it can be applied to cases where the regular expression E is written in a commonly-used regular expression syntax different from the syntax given in Equation (1).

A valid assignment of submatches for regular expression E with capturing groups indexed by $\{1, 2, \ldots c\}$ and input string a is a map sub: $\{1, 2, \ldots c\} \to \Sigma^* \cup \{\text{NULL}\}$ such that there exists $\beta \in L(E)$ satisfying the following three conditions:

$\beta|_\Sigma = \alpha$;

(ii) if $S_t$ occurs in $\beta$ then $\text{sub}(t)=\beta_t|_\Sigma$, where $\beta_t$ is the substring of $\beta$ between the last occurrence of $S_t$ and the last occurrence of $E_t$; and (iii) if $S_t$ does not occur in $\beta$ then $\text{sub}(t)=\text{NULL}$.

If $\alpha \in \Sigma^*$, a matches E if and only if $\alpha=\beta|_\Sigma$ for some $\beta \in L(E)$. For a regular expression without capturing groups, this coincides with the standard definition of the set of strings matching the expression. By definition, if there is a valid assignment of submatches for E and $\alpha$, then a matches E. It may be proved by structural induction on E that the converse is also true, that is, whenever E matches $\alpha$, there is at least one valid assignment of submatches for E and $\alpha$. The submatch extraction system may take as input a regular expression and an input string, and output a valid assignment of submatches to the capturing groups of the regular expression if there is a valid assignment, or report that the string does not match if there is no valid assignment.

The operators (,) and [,] have the same effect as [,] on the set of strings that match a regular expression. The difference is that (,) marks a subexpression whose submatch is to be reported. Similarly, the difference between the operators * and *? is not apparent in the set of valid assignments of submatches, but is apparent in which of these valid assignments is reported.

2. System

Figure 1:
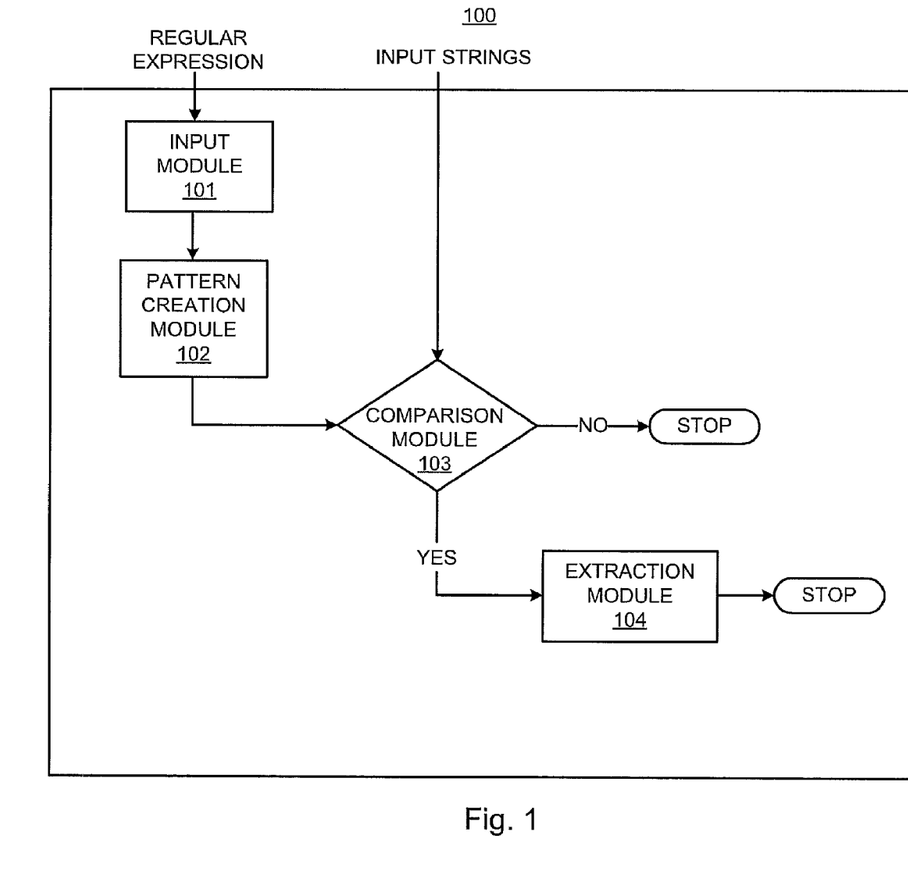
FIG. 1 illustrates an architecture of a submatch extraction system, according to an example of the present disclosure.
Figure 2:
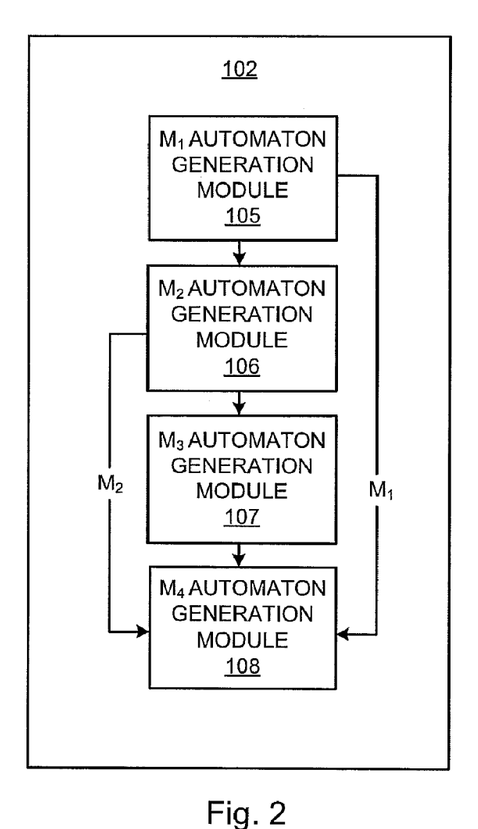
FIG. 2 illustrates an architecture of a pattern creation module of the submatch extraction system, according to an example of the present disclosure.

FIG. 1 illustrates an architecture of a submatch extraction system 100, according to an example. Referring to FIG. 1, the system 100 may include an input module 101 to receive a regular expression. The regular expression may be used to create a pattern by a pattern creation module 102. The pattern creation module 102 is described in further detail below with reference to FIG. 2. A comparison module 103 may receive input strings, and match the input strings to the regular expression. If an input string does not match the regular expression, submatches are not extracted. However, if an input string matches the regular expression, the pattern created by the pattern creation module 102 may be used to extract submatches by an extraction module 104. Referring to FIG. 2, in order to create the pattern by the pattern creation module 102, automata $M_1$, $M_2$, $M_3$ and $M_4$ may be respectively created by automata generation modules 105, 106, 107 and 108. Thus, the regular expression may be compiled by the modules 105-108 to create the pattern by the pattern creation module 102. In this manner, the regular expression may be compiled by the modules 105-108, and then matched to many different input strings to extract submatches.

The modules 101-108, and other components of the system 100 may comprise machine readable instructions stored on a computer readable medium. In addition, or alternatively, the modules 101-108, and other components of the system 100 may comprise hardware or a combination of machine readable instructions and hardware.

The components of the system 100 are described in further detail with reference to FIGS. 1-7C.

Referring to FIG. 1, for a regular expression E received by the input module 101, the regular expression E may be fixed and indices may be assigned to each capturing group to form idx(E). In order to create the pattern, the pattern creation module 102 may convert the regular expression E into two deterministic finite automata, denoted $M_3$ and $M_4$. The finite automata $M_3$ and $M_4$ may be used to match a string. For the real-time operation, the input string may be reversed and consumed by the first automaton $M_3$, and the states visited by this happens may be journaled. Once all the symbols in the string have been processed, the journaled states may be used in reverse order as input to the second automaton $M_4$, which is used to determine the start and end locations of each capturing group. These start and end locations may be used by the extraction module 104 to obtain the submatches.

Figure 3:
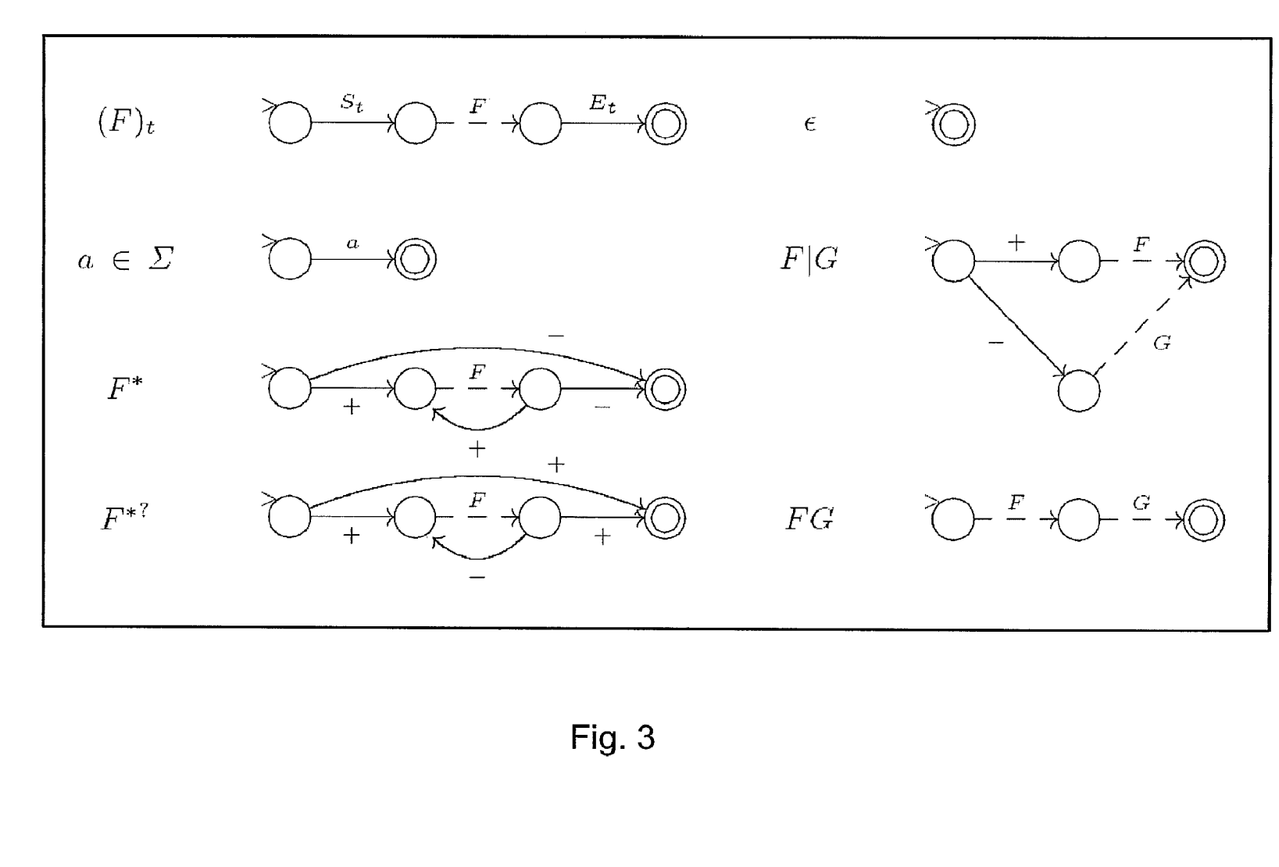
FIG. 3 illustrates rules for the construction of an automaton $M_1$, according to an example of the present disclosure.
Figure 4A:
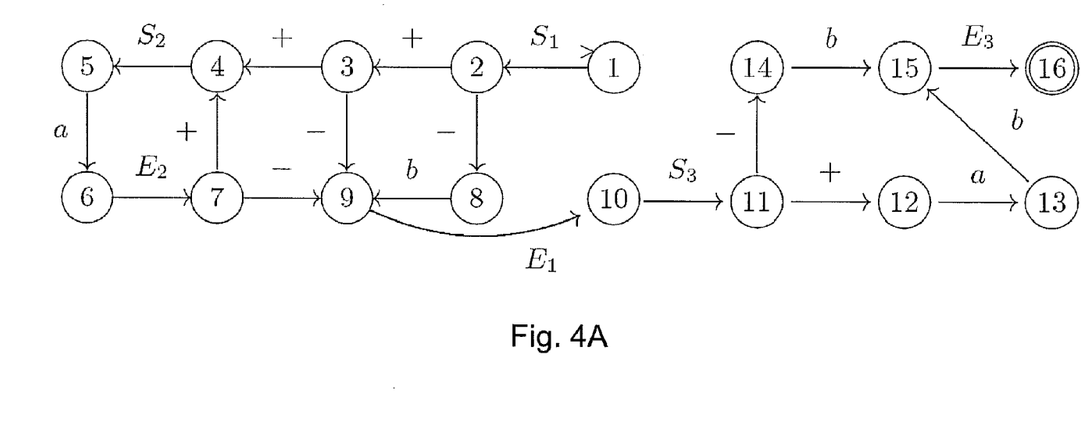
FIGS. 4A and 4B respectively illustrate a deterministic finite automaton (DFA) $M_1$ for $((a)*|b)(ab|b)$, and a nondeterministic finite automaton (NFA) $M_2$ for the same regular expression, according to an example of the present disclosure.

In order to create the pattern, the $M_1$ and $M_2$ automata generation modules 105, 106 of the pattern creation module 102 may be used to construct two finite automata, $M_1$ and $M_2$. The automaton $M_1$ is described by the tuple $(Q_1, \Sigma_1, \Delta_1, s_1, f_1)$, where $Q_1$ is a set of states identified by the integers in the set $\{1, 2 \ldots f\}$, $\Sigma_1$ is the alphabet $\Sigma \cup \{+, -\} \cup T$, where + and − are two special alphabet characters whose use is described below, $\Delta_1$ is a transition function, $s_1=1$ is the start state and $f_1=f$ is the unique final state. $\Delta_1$ is built using structural induction on the indexed regular expression, idx(E), following the rules illustrated by the diagrams of FIG. 3. For this example it is assumed that the syntax of the regular expression is that given in Equation (1). In FIG. 3, the initial state of the automaton is marked with > and the final state with a double circle. A dashed arrow with label F or G is used as shorthand for the diagram corresponding to the indexed expression F or G. For example, the automaton $M_1$ for ((a)*|b)(ab|b) is shown in FIG. 4A. The automata of FIGS. 4A, 4B, 5 and 7A-7C are illustrated as a graphical representation of state machines by way of example and not limitation.

The automaton $M_1$ uses separate transitions with labels $S_t$ and $E_t$ to indicate the start and end of a capturing group with index t, in addition to transitions labeled with + and − to indicate submatching priorities.

The automaton $M_1$ may be considered as a directed graph. If x is any directed path in $M_1$, ls(x) denotes its label sequence. Let $\pi: Q_1 \times Q_1 \rightarrow T^*$ be a mapping from a pair of states to a sequence of tags, to be used below in the construction of $M_4$, defined as follows. For any two states $q, p \in Q_1$, consider a depth-first search of the graph of $M_1$, beginning at q and searching for p, using only transitions with labels from $T \cup \{+, -\}$, and such that at any state with outgoing transitions labeled '+' and '−', the search explores all states reachable via the transition labeled '+' before following the transition labeled '−'. If this search succeeds in finding successful search path $\lambda(q, p)$, then $\pi(q, p) = ls(\lambda(q, p))|_T$ is the sequence of tags along this path. If the search fails, then $\pi(q, p)$ is undefined. $\pi(p, p)$ is defined to be the empty string. It can be shown that this description of the search uniquely specifies $\lambda(q, p)$, if it exists.

The automaton $M_1$ may be converted into the nondeterministic finite automaton (NFA) $M_2$, described by the tuple $(Q_2, \Sigma, \Delta_2, S_2, F_2)$, by the $M_2$ automaton generation module 106. The set $Q_2$ includes the final state of $M_1$ together with any state in $M_1$ that has an outgoing transition labeled with a symbol in $\Sigma$, i.e.

$$Q_2 = \{f\} \cup \{q : \exists \alpha \in \Sigma, p \in Q_1, (q, \alpha, p) \in \Delta_1\} \quad \text{Equation (2)}$$

Figure 4B:
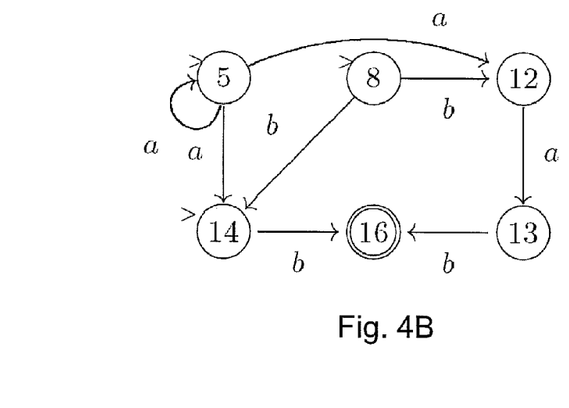

If $p, q \in Q_2$ and $a \in \Sigma$, there is a transition $(p, a, q) \in \Delta_2$ if and only if there exists a state $r \in Q_1$ such that $(p, a, r) \in \Delta_1$ and $\pi(r, q)$ is defined. $S_2$ is a set of initial states, corresponding to those states $p \in Q_2$ for which $\pi(1, p)$ is defined. For example, the automaton $M_2$ for ((a)*|b)(ab|b) is shown in FIG. 4B.

The automaton $M_2$ may be converted into the deterministic finite automaton (DFA) $M_3$ by the $M_3$ automaton generation module 107, and is specified by the tuple $(Q_3, \Sigma, \Delta_3, s_3, F_3)$. The construction of $M_3$ from $M_2$ is a standard powerset construction of a DFA from a reversed NFA. Specifically, each state in Q3 corresponds to a subset of states in the powerset of $Q_2$. The initial state $s_3$ is $\{f\}$. $Q_3$ is initialized to $\{\{f\}\}$, and states r in $Q_3$ are explored by constructing for each $a \in \Sigma$ the following set:

$$P(r, a) = \{p \in Q_2 : (p, a, q) \in \Delta_2 \text{ for some } q \in r\}, \quad \text{Equation (3)}$$

Figure 5:
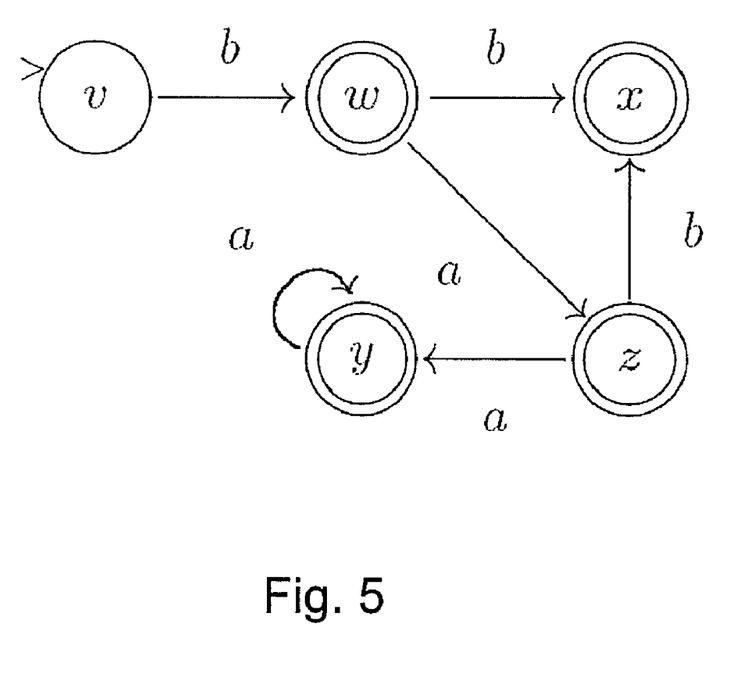
FIG. 5 illustrates an automaton $M_3$ for the regular expression $((a)*|b)(ab|b)$, where $v=\{16\}$, $w=\{13, 14\}$, $x=\{8\}$, $y=\{5\}$, and $z=\{5, 12\}$, according to an example of the present disclosure.

Equation (3) represents the set of states from which there is a transition labeled a to an element of r. If this set is not empty, it is added to $Q_3$ and the transition $(r, a, P(r, a))$ is added to $\Delta_3$. Each state in $Q_3$ previously not explored is explored until there are no states in $Q_3$ left to explore. The set of final states in $M_3$, $F_3$, is the set of all states q in $Q_3$ such that $q \cap S_2$ is not empty. As discussed above, FIG. 4B illustrates the automaton $M_2$ for the regular expression ((a)*|b)(ab|b). Further, FIG. 5 illustrates the automaton $M_3$ for the same regular expression, where $v=\{16\}$, $w=\{13, 14\}$, $x=\{8\}$, $y=\{5\}$, and $z=\{5, 12\}$.

$M_2$ and $M_3$ may be used to construct another automaton, $M_4$ by the $M_4$ automaton generation module 108. The automaton $M_4$ is a DFA except that the transition function is a four-tuple, i.e. $\Delta_4 \subseteq Q_2 \times Q_3 \times Q_2 \times T^*$. The DFA is similar to $M_2$ with one extra state, where the input alphabet is $Q_3$ instead of $\Sigma$, and some edges are deleted. The description of automaton $M_4$ that follows will use some notation concerning $\Sigma_1$ and $M_1$. Let $\prec$ be the lexicographic partial ordering on the set of strings in $\Sigma^*_1$ generated by the relation $\{(-, +)\} \cup \{(a, a) : a \in \Sigma_1\}$ on $\Sigma_1$.

Next a new state labeled '0' is introduced, which is the start state of $M_4$. To define $\Delta_4$, let $(q, P, p, \tau)$ be in $\Delta_4$ if there exist $q, r \in Q_2$, $P \in Q_3$, $p \in P$, $a \in \Sigma$, such that $(q, a, r) \in \Delta_1$, $\pi(r, p)$ is defined, and $$\tau = \pi(r, p) = \left(\max_{\prec}\{ls(\lambda(r, p')) : p' \in P\}\right)\Big|_T \quad \text{Equation (4)}$$

Similarly, let $(0, P, p, \tau)$ be in $\Delta_4$ if there exist $P \in Q_3$, $p \in P$ such that $\pi(1, p)$ is defined, and $$\tau = \pi(r, p) = \left(\max_{\prec}\{ls(\lambda(r, p')) : p' \in P\}\right)\Big|_T \quad \text{Equation (5)}$$

It can be proved that these maximal elements exist, and are unique.

Figure 6:
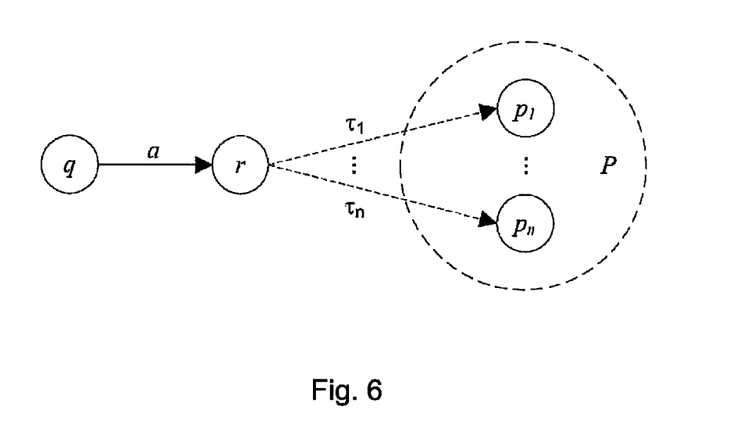
FIG. 6 illustrates relationships among q, r, P, p, and τ in the construction of the automaton $M_4$, according to an example of the present disclosure.
Figure 7A:
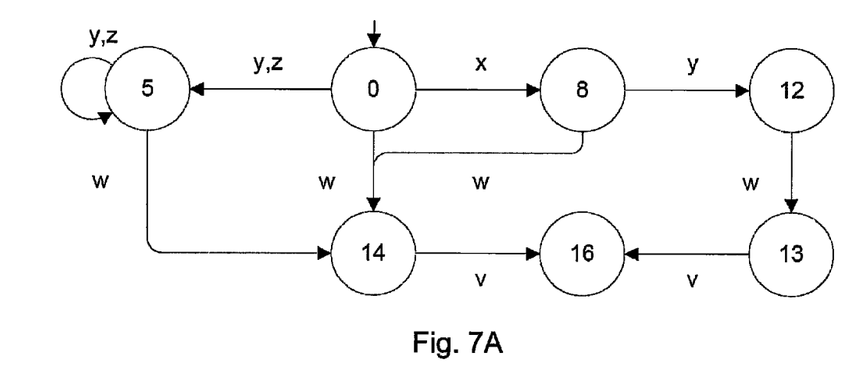
Figure 7B:
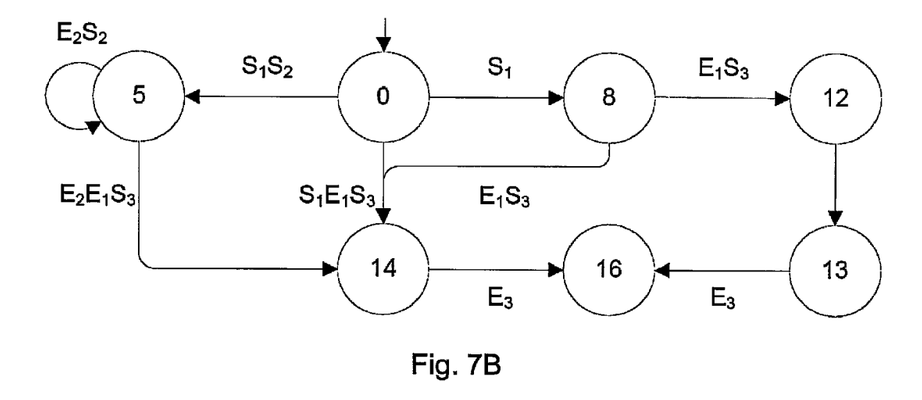
Figure 7C:
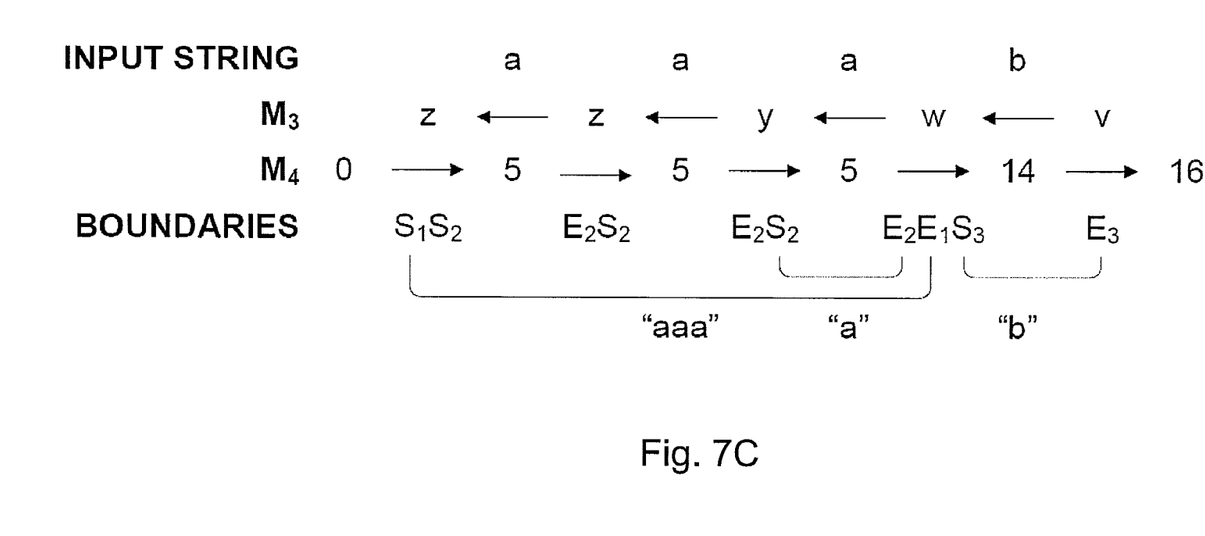
FIG. 7C illustrates a simplified diagram of an input string, automata $M_3$ and $M_4$, and boundaries, according to an example of the present disclosure.

FIG. 6 illustrates the relationships among q, r, P, p, and τ in the construction of the transition function for $M_4$. Referring to FIG. 6, for the construction of $M_4$, q, r, p, $\in Q_1$, P={$p_1, \ldots, p_n$}$\in Q_3$, each path $\lambda(r, p_i)$ has label sequence $\tau_i$, and $\tau = \pi(r, p) = (\max \prec \{\tau_1, \ldots, \tau_n\})|_T$. FIGS. 7A and 7B illustrate the automaton $M_4$ for the regular expression ((a)*|b)|(ab|b), showing the inputs from Q3 and the outputs in T*, respectively, and FIG. 7C illustrates a simplified diagram of an input string, automata $M_3$ and $M_4$, and boundaries.

As discussed above, if an input string matches the regular expression, the pattern created by the pattern creation module 102 may be used to extract submatches by the extraction module 104 as follows.

Extracting the submatches for a string $a_1 \ldots a_r \in \Sigma^*$ may occur as follows. The extraction process is subdivided in steps 1-3 for facilitating the description of the submatch extraction system 100. First, for step 1, the string $a_l a_{l-1} \ldots a_1$ is processed using $M_3$. As it is processed, the states $q_l, q_{l-1}, \ldots$ visited during the processing are journaled, where $q_l$ is {f}, the initial state of $M_3$. If the processing terminates before the whole input string has been processed, or terminates with $q_0 \notin_3$, it is reported that the string does not match, and the submatch extraction terminates. It can be proved that if $M_3$ has been constructed in the way described in the example, this will happen if and only if the string does not match.

Next, for step 2, if the submatch extraction did not terminate in the previous step, the system 100 may run $M_4$ on input $q_0, q_1, \ldots q_l$, using an additional data structure along the way in order to discover the submatch values for each capturing group. The data structure may include an array of length $2c$, indexed by elements of T, all initialized to NULL. While processing the $i^{th}$ transition, namely $(q_i, P, q_{i+1}, \in \Delta_4$, for each tag in $\tau \in T^*$, the system 100 may write i in the array entry corresponding to the tag, overwriting the current entry. It can be proved that if $M_4$ is constructed in the way described in this example, this process will not terminate before all of $q_0, q_1, \ldots q_l$ have been processed by $M_4$.

Next, for step 3, the submatch extraction system 100 uses the resulting array to read off the submatches from the input string, as follows. If the array entries for the tags $S_j$ and $E_j$ are $s_j$ and $e_j$, respectively, then the system reports that the submatch for capturing group j is $a_{s_j+1} \ldots a_{e_j}$. If the array entries for $S_j$ and $E_j$ are NULL, then the system reports that there is no submatch for the $j^{th}$ capturing group. It can be proved that if $M_3$ and $M_4$ are the automata described in the example, in the case that the array entries for $S_j$ and $E_j$ are NULL, there is indeed no submatch. It can also be proved that if $M_3$ and $M_4$ are the automata described in this example, the assignment of submatches that is reported by the system is valid.

Referring to FIGS. 5 and 7A-7C, an example of processing an input string aaab for the regular expression ((a)*|b)|(ab|b) is described. As discussed above, FIG. 5 illustrates the automaton $M_3$ for the regular expression ((a)*|b)(ab|b), where the states in FIG. 5 correspond to sets of states in FIG. 4B as follows: v={16}, w={13,14}, x={8}, y={5}, and z={5, 12}. Referring to FIG. 5, in step 1, the reversed input string is processed as baaa using $M_3$. As shown in FIG. 5, the processing begins at v, then proceeds from v to w (processing the symbol b), then proceeds from w to z (processing a), then proceeds from z to y (processing another a), then remains at y (processing another a). The states journalled during this processing are v, w, z, y and y, i.e. states {16}, {13,14}, {5,12}, {5}, {5} respectively. These states are then input in reverse order into the automaton $M_4$. Referring to FIG. 7A, the states visited are {16}, {13,14}, {5,12}, {5}, {5}, and respectively correspond to v, w, z, y and y. For the processing of these states in this example, referring to FIGS. 7A and 7B the state of $M_4$ is initially 0, then transitions to 5 as a result of receiving the input {5}, giving output $S_1 S_2$, then remains at 5 after receiving input {5}, giving output $E_2 S_2$, then remains at 5 after receiving input {5, 12}, giving output $E_2 S_2$, then transitions to 14 as a result of receiving input {13, 14}, giving output $E_2 E_1 S_3$, and transitions to 16 as a result of receiving input {16}, giving output $E_3$. Thus in step 2, the submatch extraction system 100 runs automaton $M_4$ with input ({5}, {5}, {5,12}, {13,14}, {16}), writing entries in the array with each transition. The resulting array reads as follows:

$$[S_1, E_1, S_2, E_2, S_3, E_3] = [0, 3, 2, 3, 3, 4] \quad \text{Equation (7)}$$

In step 3, the extraction module 104 reads from the array that the three capturing groups have respective submatches aaa, a, and b. For example, referring to FIG. 7C, it can be seen that the last instance of each S and each E is kept. The submatches to the capturing groups are read off from the input string aaab using this array, resulting in submatch aaa to capturing group 1, a to capturing group 2 and b to capturing group 3.

3. Method

Figure 8:
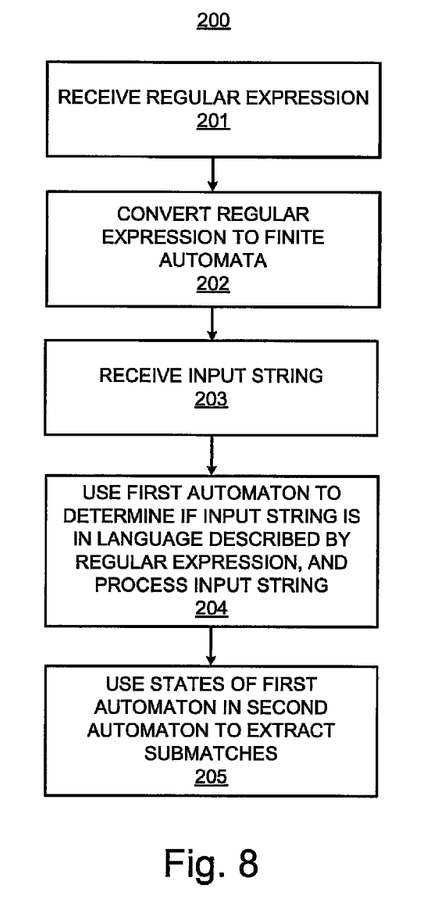
FIG. 8 illustrates a method for submatch extraction, according to an example of the present disclosure.
Figure 9:
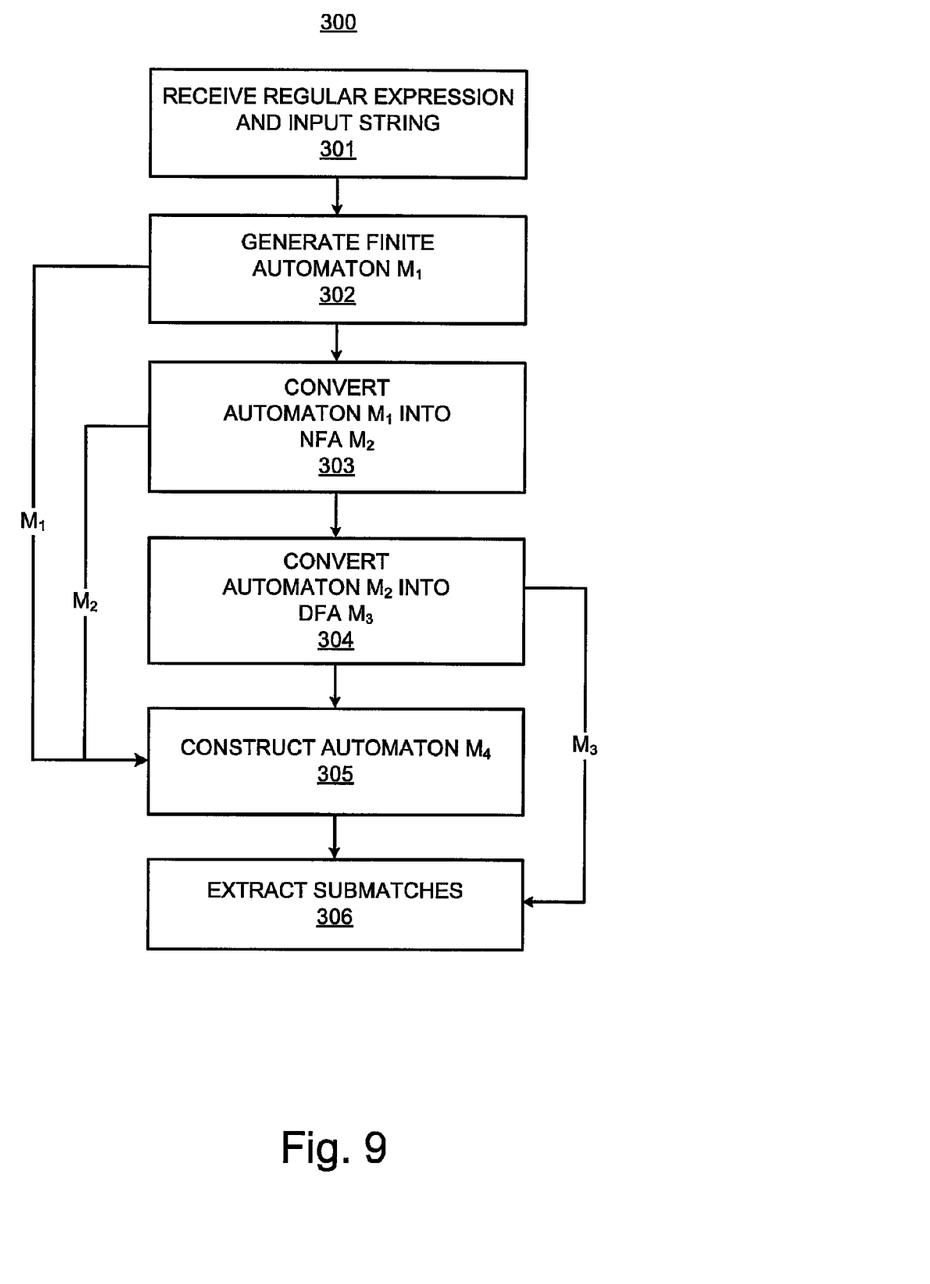
FIG. 9 illustrates a further detailed method for submatch extraction, according to an example of the present disclosure.

FIGS. 8 and 9 illustrate flowcharts of methods 200 and 300 for submatch extraction, corresponding to the example of a submatch extraction system whose construction is described in detail above. The methods 200 and 300 may be implemented on the submatch extraction system with reference to FIGS. 1-7C by way of example and not limitation. The methods 200 and 300 may be practiced in other systems.

Referring to FIG. 8, at block 201, the example method includes receiving a regular expression.

At block 202, the example method includes converting the regular expression with capturing groups into a plurality of finite automata to extract submatches. In this example method, these are the automata $M_1$, $M_2$, $M_3$ and $M_4$ whose construction is described above.

At block 203, the example method includes receiving an input string.

At block 204, the example method includes using a first automaton (i.e., $M_3$) to determine whether the input string is in a language described by the regular expression, and to process the input string.

At block 205, the example method includes using states of the first automaton (i.e., $M_3$) in a second automaton (i.e., $M_4$) to extract the submatches. This includes reversing the input string and processing the reversed input string by the automaton $M_3$, and using the states visited during the processing of the reversed input string in reverse order as input to the automaton $M_4$ to extract the submatches. Indices may be assigned to the capturing groups for the regular expression, the start and end locations of each capturing group may be determined, and the start and end locations may be used to extract the submatches.

Referring to FIG. 9, the further detailed method 300 for submatch extraction is described. At block 301, the example method includes receiving a regular expression and an input string.

At block 302, the example method includes generating the finite automaton $M_1$, whose construction is described above.

At block 303, the example method includes converting the automaton $M_1$ into another automaton, the NFA $M_2$, whose construction is described above.

At block 304, the example method includes converting the automaton $M_2$ into the DFA $M_3$, whose construction is described above.

At block 305, the example method includes using $M_1$, $M_2$ and $M_3$ to construct another automaton, $M_4$, whose construction is described above. Thus, the example method includes converting the regular expression with capturing groups into the automata $M_3$ and $M_4$.

At block 306, the example method includes reversing the input string and processing the reversed input string by the automaton $M_3$, and using the states visited during the processing of the reversed input string in reverse order as input to the automaton $M_4$ to extract the submatches. The method also includes assigning indices to the capturing groups for the regular expression, determining start and end locations of each capturing group, and using the start and end locations to extract the submatches.

4. Computer Readable Medium

Figure 10:
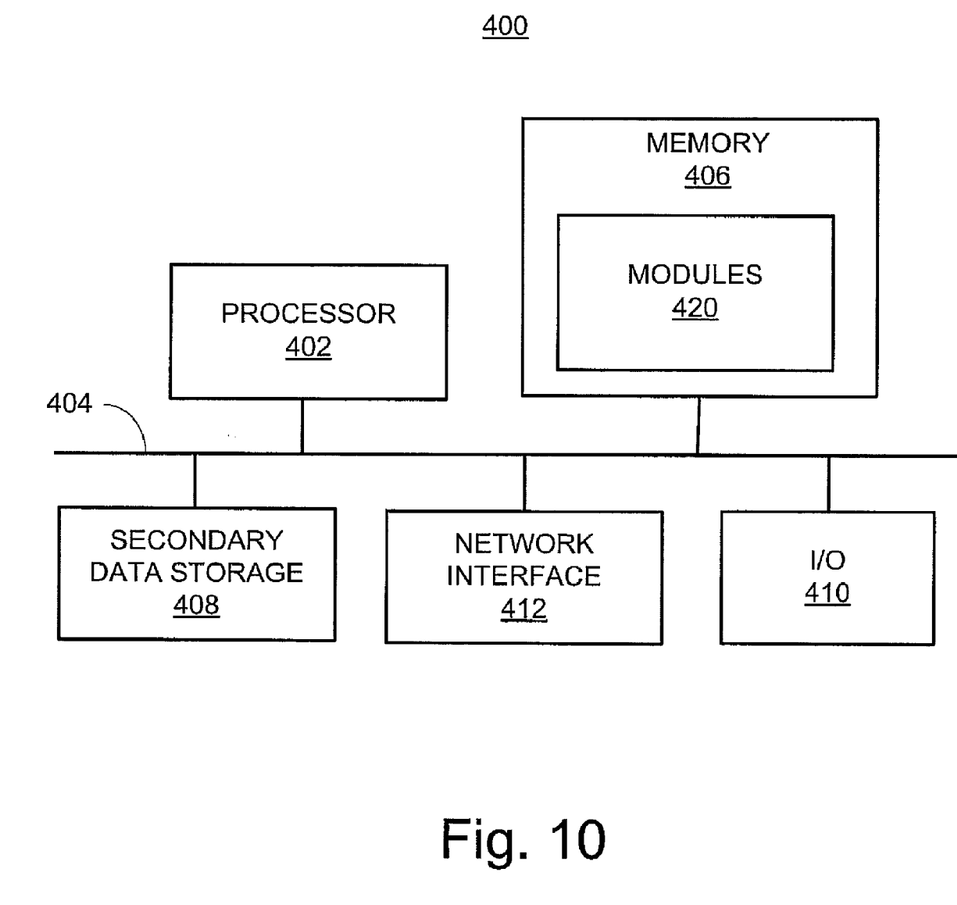
FIG. 10 illustrates a computer system, according to an example of the present disclosure.

FIG. 10 shows a computer system 400 that may be used with the examples described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 101-108 of the system 100 shown in FIG. 1.

The computer system 400 may include an I/O device 410, such as a keyboard, a mouse, a display, etc. The computer system 400 may include a network interface 412 for connecting to a network. Other known electronic components may be added or substituted in the computer system 400.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method comprising:
receiving an input string;
receiving a regular expression;
converting, by a system comprising a hardware processor, the regular expression into a plurality of automata to extract submatches of substrings in the input string, wherein the extracting comprises:
using a first automaton of the plurality of automata to determine whether the input string is in a language described by the regular expression, and to process the input string; and
using states of the first automaton in a second automaton of the plurality of automata to extract the submatches; and
identifying, by the system, a source of an issue in a network in response to the submatches.

2. The method of claim 1, further comprising:
inputting a reversed input string into the first automaton; and
inputting the states in reverse order into the second automaton.

3. The method of claim 1, further comprising:
implementing the method in a parser.

4. The method of claim 1, further comprising:
implementing the method in a security information and event management (SIEM) system.

5. The method of claim 1, wherein each automaton of the plurality of automata includes a plurality of states and rules for traversing the plurality of states.

6. The method of claim 5, further comprising storing each automaton of the plurality of automata as machine readable instructions.

7. The method of claim 1, wherein the converting and the identifying are performed by a security application.

8. The method of claim 1, wherein identifying the source of the issue comprises identifying a source of an attacker of the network.

9. A system comprising:
a hardware processor; and
a memory storing machine readable instructions executable on the hardware processor to:
receive an input string;
receive a regular expression;
convert the regular expression into a plurality of automata to extract submatches of substrings in the input string, wherein the extracting comprises:
using a first automaton of the plurality of automata to determine whether the input string is in a language described by the regular expression, and to process the input string; and
using states of the first automaton in a second automaton of the plurality of automata to extract the submatches; and
identify a source of an issue in a network in response to the submatches.

10. The system of claim 9, wherein the machine readable instructions are executable on the hardware processor to:
convert the regular expression with capturing groups into the plurality of automata to extract the submatches.

11. The system of claim 9, wherein the machine readable instructions are executable on the hardware processor to:
input a reversed input string into the first automaton; and
input the states in reverse order into the second automaton.

12. The system of claim 9, wherein the machine readable instructions are part of a parser.

13. The system of claim 9, comprising a security information and event management (SIEM) system.

14. The system of claim 9, wherein each automaton of the plurality of automata includes a plurality of states and rules for traversing the plurality of states.

15. The system of claim 9, wherein the identifying of the source of the issue comprises identifying a source of an attacker of the network.

16. A non-transitory computer readable medium having stored thereon machine readable instructions that when executed cause a computer system to:
- receiving an input string;
- receiving a regular expression;
- convert the regular expression into a plurality of automata to extract submatches of substrings in the input string, wherein the extracting comprises:
  - using a first automaton of the plurality of automata to determine whether the input string is in a language described by the regular expression, and to process the input string; and
  - using states of the first automaton in a second automaton of the plurality of automata to extract the submatches; and
- identify a source of an issue in a network in response to the submatches.

17. The non-transitory computer readable medium of claim 16, the machine readable instructions when executed cause the computer system to:
- convert the regular expression with capturing groups into the plurality of finite automata to extract the submatches.

18. The non-transitory computer readable medium of claim 16, the machine readable instructions when executed cause the computer system to:
- input a reversed input string into the first automaton; and
- input the states in reverse order into the second automaton.

19. The non-transitory computer readable medium of claim 16, wherein each automaton of the plurality of automata includes a plurality of states and rules for traversing the plurality of states.

20. The non-transitory computer readable medium of claim 19, wherein each automaton of the plurality of automata comprises machine readable instructions.

* * * * *